(12) United States Patent
Qiu et al.

(10) Patent No.: US 11,314,796 B2
(45) Date of Patent: Apr. 26, 2022

(54) DIMENSION-SPECIFIC DYNAMIC TEXT INTERFACE FOR DATA ANALYTICS

(71) Applicant: Business Objects Limited Ltd., Dublin (IE)

(72) Inventors: Xin Qiu, Vancouver (CA); Ivan Cheng, Vancouver (CA); James Lloyd, Vancouver (CA)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/708,101

(22) Filed: Dec. 9, 2019

(65) Prior Publication Data
US 2021/0173861 A1   Jun. 10, 2021

(51) Int. Cl.
| | |
|---|---|
| *G06F 16/33* | (2019.01) |
| *G06F 16/338* | (2019.01) |
| *G06F 16/335* | (2019.01) |
| *G06F 16/953* | (2019.01) |
| *G06F 16/835* | (2019.01) |
| *G06F 16/83* | (2019.01) |
| *G06F 16/9538* | (2019.01) |

(52) U.S. Cl.
CPC ........ *G06F 16/3346* (2019.01); *G06F 16/337* (2019.01); *G06F 16/338* (2019.01); *G06F 16/83* (2019.01); *G06F 16/835* (2019.01); *G06F 16/8373* (2019.01); *G06F 16/953* (2019.01); *G06F 16/9538* (2019.01)

(58) Field of Classification Search
CPC ... G06F 16/3346; G06F 16/337; G06F 16/338
See application file for complete search history.

(56) References Cited

U.S. PATENT DOCUMENTS

| | | | | |
|---|---|---|---|---|
| 10,181,256 B2* | 1/2019 | Wu | ................. | G08B 25/10 |
| 2010/0063881 A1* | 3/2010 | Ghosh | ............... | G06Q 30/0256 |
| | | | | 705/14.54 |
| 2010/0070607 A1* | 3/2010 | Khan | ................. | G06Q 30/02 |
| | | | | 709/217 |
| 2012/0254188 A1* | 10/2012 | Koperski | ........... | G06F 16/9535 |
| | | | | 707/740 |
| 2015/0134694 A1* | 5/2015 | Burke | ............. | G06Q 10/06398 |
| | | | | 707/769 |
| 2015/0178395 A1* | 6/2015 | Tiwari | ............... | G06F 16/3349 |
| | | | | 707/692 |

(Continued)

*Primary Examiner* — Keith D Bloomquist
(74) *Attorney, Agent, or Firm* — Fountainhead Law Group P.C.

(57) ABSTRACT

Embodiments relate to a dynamic text provider that generates and communicates a text object to a text consumer (e.g., a table with a text header, a chart having text axis labels and/or title). An engine is positioned between a dynamic text service, and an underlying data set organized according to a model with hierarchical elements (e.g., measures, dimensions, pages). The engine receives an input from the text consumer. The input includes at least a first identifier of the text consumer, a second identifier of the data set, and a third identifier of a specific element (e.g., dimension) of the model. The engine references the model to create a context. Based upon that context, the engine queries the data set to generate a dynamic text object including a list of values (LOV) for the dimension. The dynamic text object including the LOV is communicated to the text consumer.

7 Claims, 9 Drawing Sheets

(56) References Cited

U.S. PATENT DOCUMENTS

2016/0162582 A1* 6/2016 Chatterjee .......... G06F 16/9535
                                                                707/706
2018/0089316 A1* 3/2018 Ganot ................ G06F 16/3344
2018/0365580 A1* 12/2018 Musuvathi ......... G06Q 30/0242
2020/0034357 A1* 1/2020 Panuganty ............ G06F 16/248
2020/0133945 A1* 4/2020 Friedt ................ G06F 16/2471

* cited by examiner

| Filter Type | Detail |
|---|---|
| Prompt | Modify StoryModel.updateDatasetPromptValues, excluded by dataset only (Excluded Entries excluded by dataset ONLY SPECIAL CASE |
| Linked Prompt | VariableLinkService._incrementalUpdateDatasetValues calls updateDatasetPromptValue for every DS |
| Story | Affects datasets and linked datasets, add/remove both provide filterDatasetIds affected(s) in filterLookupService |
| Page | Add page provides filterDatasetId, remove does not (since from removedWidget workflow) affected(s) in filterLookupService |
| Hyperlink | Already supported, we don't need to trigger refresh here since it refreshes all |

FIG. 8

| Filter Type | Detail |
|---|---|
| Topic | Looks the same as a story filter. |
| CCO/C | We have a list of CCO/C targets (each affected filter becomes a target) that eventually goes through a getIncludedEntriesFromDescriptors call, that goes to filterSource. notifyFilterChangeCompleted, same as SET_FILTER. |
| MBF | Same as story/page but with extra MBF dataset relied in. |
| GEO | For linked analysis cases, it triggers an UPDATE_CONTENT call. |
| CC | Does fire updateContent from CatomonControlWidget, we are OK with this not working. |
| | ExcludedEntries from storyModel.getUnaffectedEntriesForWidgets |
| Chart Filter | Event VIZ_FILTERS_CHANGED fired from InfoChartVizWidget._onVizFilterChanged, can listen to this separately since updateContent is not triggered. |
| MSC/DSC | No impact |
| Complex Filter | Provides filterDatasetIds. It's no different. Then story filter. |
| Blending/Indirect | Covered by getting linked dataset. (mostly story/page) |
| ADD/REMOVE member to GROUP | It needs to update content to remove transient filters, if there were any. |

FIG. 9

DIMENSION-SPECIFIC DYNAMIC TEXT INTERFACE FOR DATA ANALYTICS

BACKGROUND

Unless otherwise indicated herein, the approaches described in this section are not prior art to the claims in this application and are not admitted to be prior art by inclusion in this section.

Data analytics applications allow for the interrogation and visualization of highly complex data sets, featuring information structured according to data objects, tables, hierarchies, dimensions, measures, and other features. The nature of that structured information stored within a database, is organized according to particular aspects of one or more story models through which the underlying data is relevant.

Applications for performing analysis upon such database data, may present a dynamic text interface. Typically, however, such interfaces refer to static values pre-existing within a particular story model. Thus a text interface might be 'dynamic' in the sense that it would allow data objects to be changed, but may be limited to offering static values.

For example, in a story model involving foodstuffs, a filter might be able to filter on values of story elements such as apples, oranges, and beer. However, the dynamic text would be limited to offering just those static values: e.g., Apples, Oranges, Beer.

SUMMARY

Embodiments relate to a dynamic text provider that generates and communicates a text object to a text consumer (e.g., a text widget, a chart having text axis labels and/or title). An engine is positioned between a dynamic text service, and an underlying data set organized according to a model with hierarchical elements (e.g., measures, dimensions, pages). The engine receives an input from the text consumer. The input includes at least a first identifier of the text consumer, a second identifier of the data set, and a third identifier of a specific element (e.g., dimension) of the model. The engine references the model to create a context. Based upon that context, the engine queries the data set to generate a dynamic text object including a list of values (LOV) for the dimension. The dynamic text object including the LOV is communicated to the text consumer. Updating of the text consumer with a second text object, is accomplished by the broadcast of an update event received by the engine.

The following detailed description and accompanying drawings provide a better understanding of the nature and advantages of various embodiments.

DETAILED DESCRIPTION

Described herein are methods and apparatuses implementing a dynamic text interface for a data analytics application. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
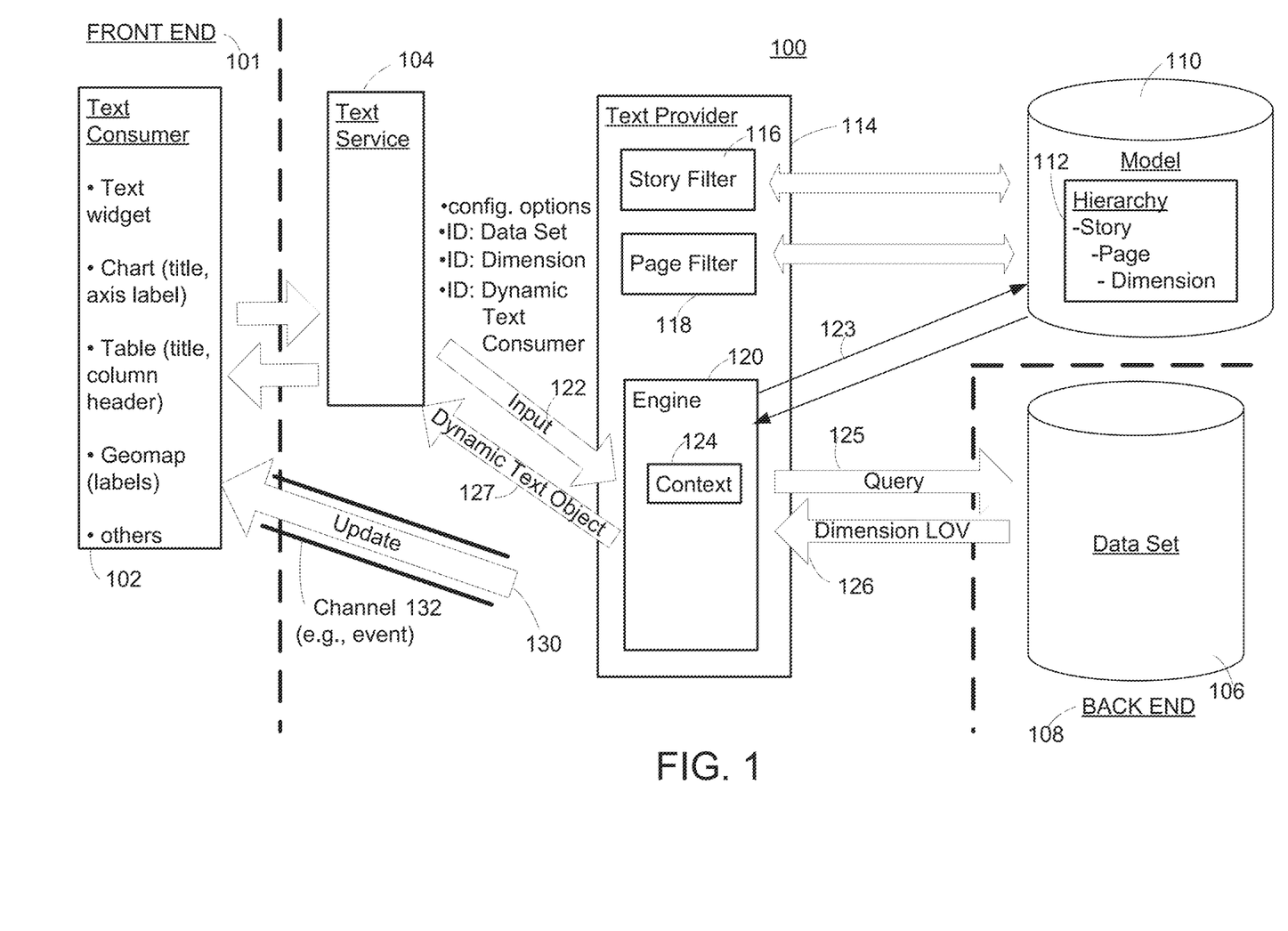
FIG. 1 shows a simplified diagram of a system according to an embodiment.

FIG. 1 shows a simplified view of an example system that is configured to implement a dynamic text interface according to an embodiment. Specifically, a front end 101 of system 100 comprises a plurality of text consumers 102 that are in communication with a text service 104.

According to embodiments, the text consumers are configured to dynamically display up-to-date text relevant to an underlying data set 106 of a back end 108. Examples of such text consumers can include but are not limited to:

a text widget;
a chart which includes text for a title and/or axis labels;
a table which includes text (e.g., for a title and/or column header);
a geomapping interface which includes text labels for locations.

The data set on the back end is organized according to a model 110. In particular, the model reflects a hierarchy having a structure 112 that includes stories, pages, and dimensions. Other elements of a hierarchical model can include measures and data objects.

The text service is in communication with a text provider 114. In particular, that text provide may include a story filter 116 and a page filter 118 as input controls (ICs).

In this manner, the text provider may reference the model to return text objects for display by the text consumers. For example, the story filter of the text provider could return to a particular (e.g., chart) text consumer, text that is relevant to a particular story.

However, under certain circumstances a text consumer may desire to display text specific to a particular dimension in the data set. Accordingly, the text provider further comprises an engine 120.

The engine receives input 122 from the text consumer. That input includes at least:

1) an identifier of the particular text consumer
2) an identifier of the data set; and
3) an identifier of a specific element (e.g., dimension) of the model.

Additionally, the input may include one or more configuration options. Examples of such options can include the display of certain hierarchy information (e.g., levels, hierarchy path members).

In response to the input, the engine references 123 the model to create a context 124. Based upon that context, the engine issues a query 125 to the underlying data set.

As a query result, the engine receives back from the data set, a list of values 126 for the queried dimension. From this LOV, the engine generates a dynamic text object 127 including a list of values (LOV) for the identified dimension.

The dynamic text object is then communicated back to the text consumer via the text service. Accordingly, the text consumer may dynamically include text that is relevant to displayed data of the data set (e.g., a chart text consumer may accurately label a chart axis with the text of the dimension).

Once created, the dynamic text object may be updated utilizing a same mechanism. That is, the text consumer receives an update event 130 that is communicated through a separate channel 132.

In response to receiving the update event, the text consumer again contacts the engine of the text provider via the text service. The data set is re-queried, and dynamic text object including updated information from the data set, is returned for consumption.

Figure 2:
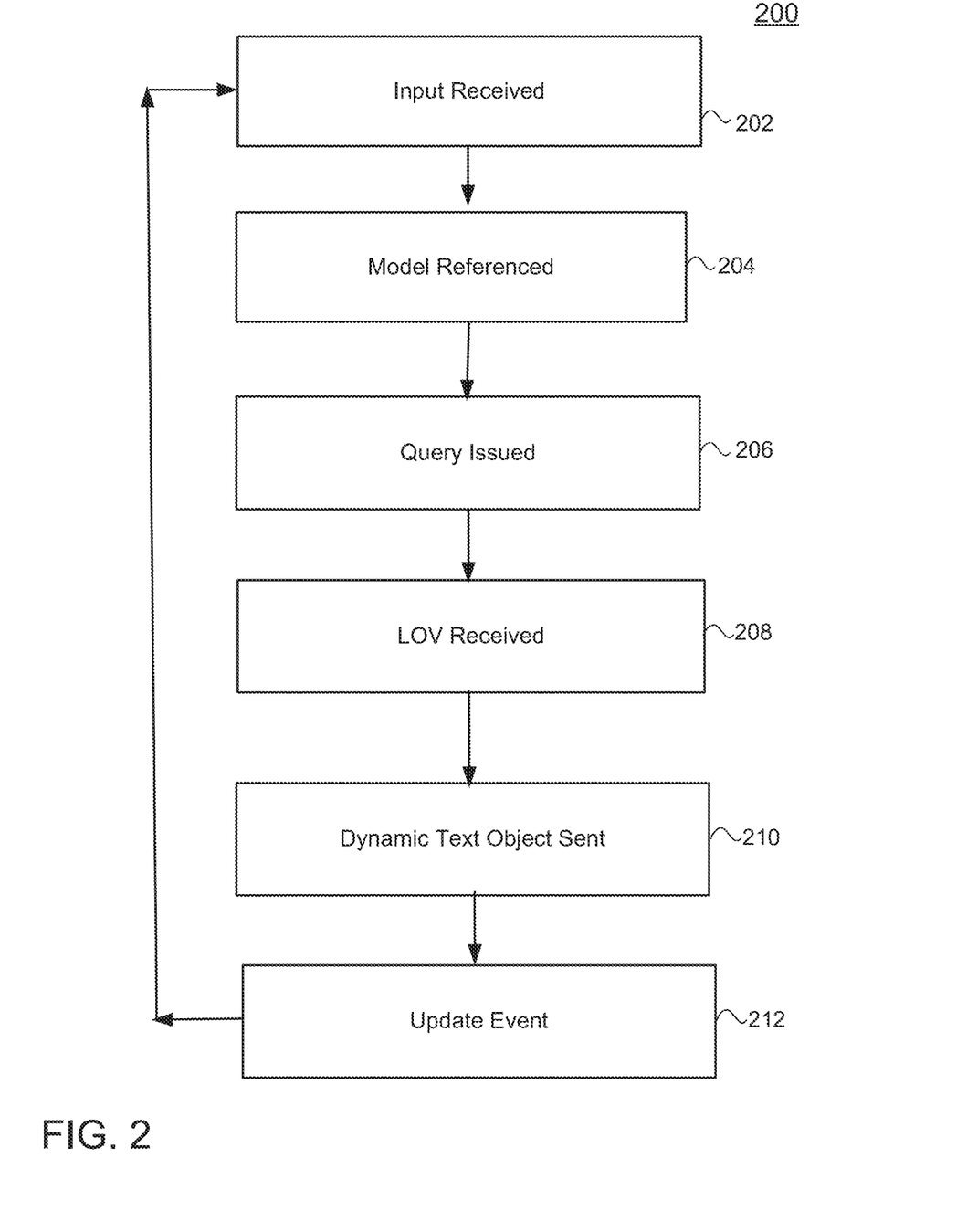
FIG. 2 shows a simplified flow diagram of a method according to an embodiment.

FIG. 2 is a flow diagram showing various actions taken in a method 200 according to an embodiment. At 202, an input comprising various identifiers (of the text consumer, of the data set, of the dimension) is received.

At 204, in response to the input a model is referenced to return a context. At 206, based upon the context a query is issued to the data set.

At 208, a List of Values (LOV) is received back from the data set, and a corresponding dynamic text object is generated.

At 210, a dynamic text object is generated from the LOV, and communicated as output to the text service and ultimately to the text consumer. At 212 an update event may trigger the engine to again receive an input from the text consumer.

Embodiments may offer certain benefits over conventional approaches. For example, certain embodiments afford the ability to dynamically provide text relevant to particular dimensions. Rather than being limited to the text returned from a particular story filter/page filter IC, embodiments allow the return of a dynamic text object at a dimension level of a hierarchy, for consumption.

Further details regarding a dynamic text interface, are now provided in connection with particular examples involving specific elements available from SAP SE, of Walldorf, Germany.

EXAMPLE

The SAP Analytics Cloud (SAC) application available from SAP SE, allows interrogation and visualization of complex data sets stored remotely. Embodiments offer the ability to create dynamic text, based upon filter values not present at the time of creation of the dynamic text. In the specific context of SAC according to this example, such filters include those created via hyperlink, and also linked analysis (LA) filters.

Three possible use cases for a dynamic text interface according to embodiments, are now described. In a first use case, a SAC customer may access a detailed input control (which can have an associated dynamic text) in order to depict those members being filtered. Absent such an input control, or if linked analysis is driven from a chart, inaccurate text could be shown unless a dynamic text interface according to embodiments is utilized.

According to a second possible use case, a SAC customer can have a story filter today on a first story (A), with an associated dynamic text that shows a List of Values (LOV). If a user from another story (B) has a hyperlink that sends a filter to that story A, there is no way for text to reflect the combination of these filter values unless a dynamic text interface according to embodiments is utilized.

In a third possible use case, a SAC customer may have an Input Control (IC) that drives text about a particular member (e.g., employee information about Bob). While current functionality may show Bob, a user may seek other details about him (e.g., age, wage, years with the company), which may be difficult to access unless a dynamic text interface according to embodiments is utilized.

In order to address issues raised by these use cases, embodiments provide a new form of dynamic text capability that refers to non-static values, and also respects filters. In this specific example, the dynamic text interface shows by default, all members of a dimension. The dynamic text interface then further respects filter values based on its context.

For example, if the input text to be interpreted it is present on a page, the list of dimensions respects story filters and page filters. In another example, if the text is located in a chart, the dynamic text interface further respects the chart filters (according to that context). Also, certain embodiments allow the text to be configured to be a receiver of linked analysis.

In implementing this particular example, the SAC dynamic text interface may be uniquely keyed by one or more of:
datasetId,
dimensionId,
widgetId,
id/desc, and
hierarchy (+details.)

In terms of hierarchy details, embodiments allow the user to configure:
the hierarchy displayed,
the level of the hierarchy, and/or
whether or not intermediary members in the path are to be shown.

This example constructs a service "EntityLOVService". This service fires a query based on the unique key. The service issues a query when it is determined that the value based on the unique key could have changed. The determination of a changed value according to this example, is described below in the technical implementation.

It is noted that if a same dimension is referenced in a same filtering context, a cached value is displayed to the user. The cached value may be used rather than issuing a new query.

Figure 3:
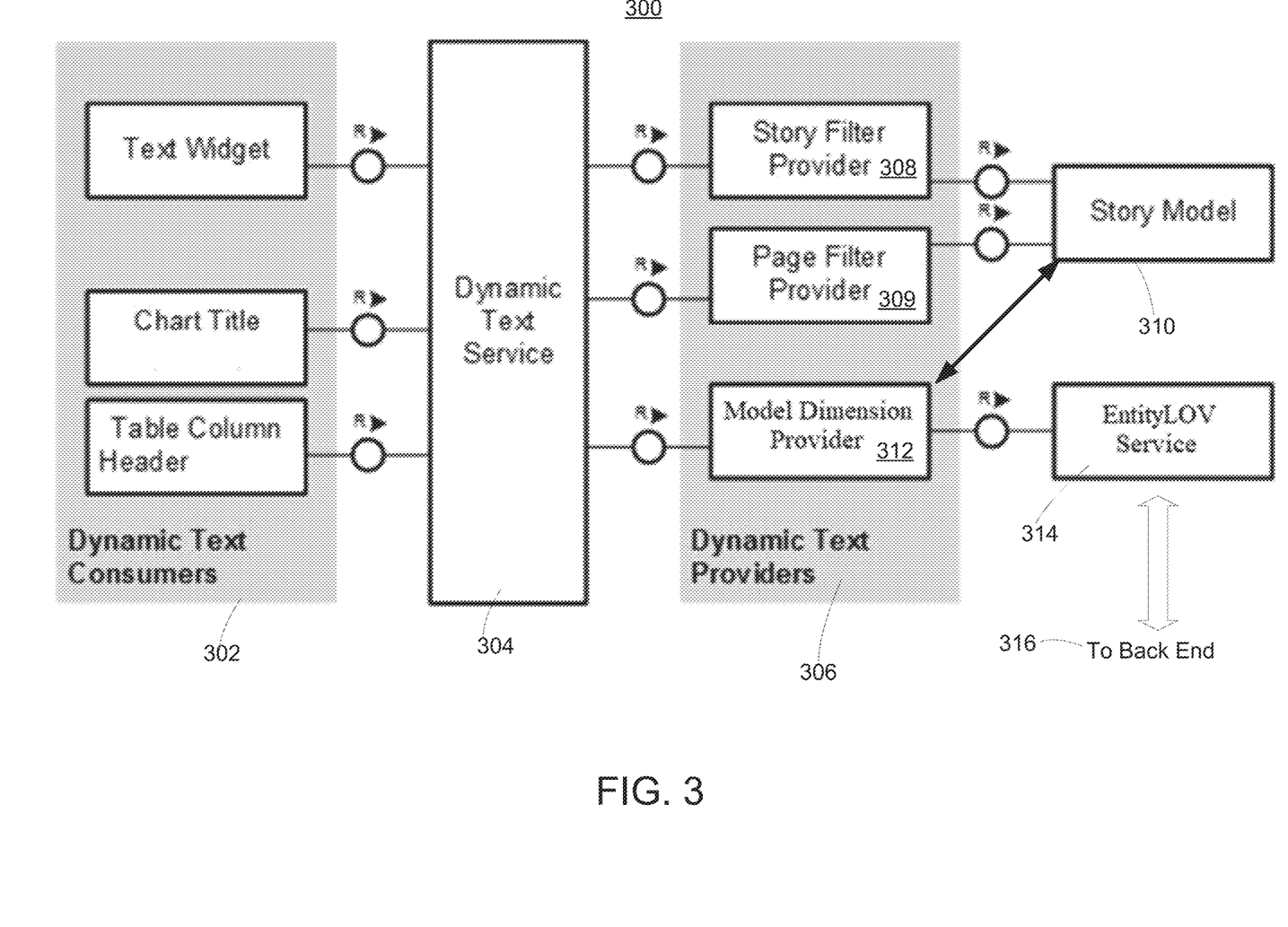
FIG. 3 shows a simplified block diagram of a system according to an example.

The technical implementation according to this specific example, is now described. FIG. 3 shows a simplified block diagram illustrating different components of a SAC system architecture modified to accommodate a dynamic text interface according to an embodiment.

From left-to-right, the system 300 of Figure includes the various text consumers, 302, the text service 304, and the text provider 306. The text provider includes a story filter 308 and a page filter 309 that are in communication with a story model 310.

Also shown are the model dimension provider 312 and the EntityLOV service 314 that correspond to the engine. The Model Dimension Provider is in communication with the story model, and the EntityLOV service is in communication with the back end 316 (where the data set is stored).

Operation of this system is now described. First, a user picks a dimension from the UI which can be added to one of the consumers.

Figure 4:
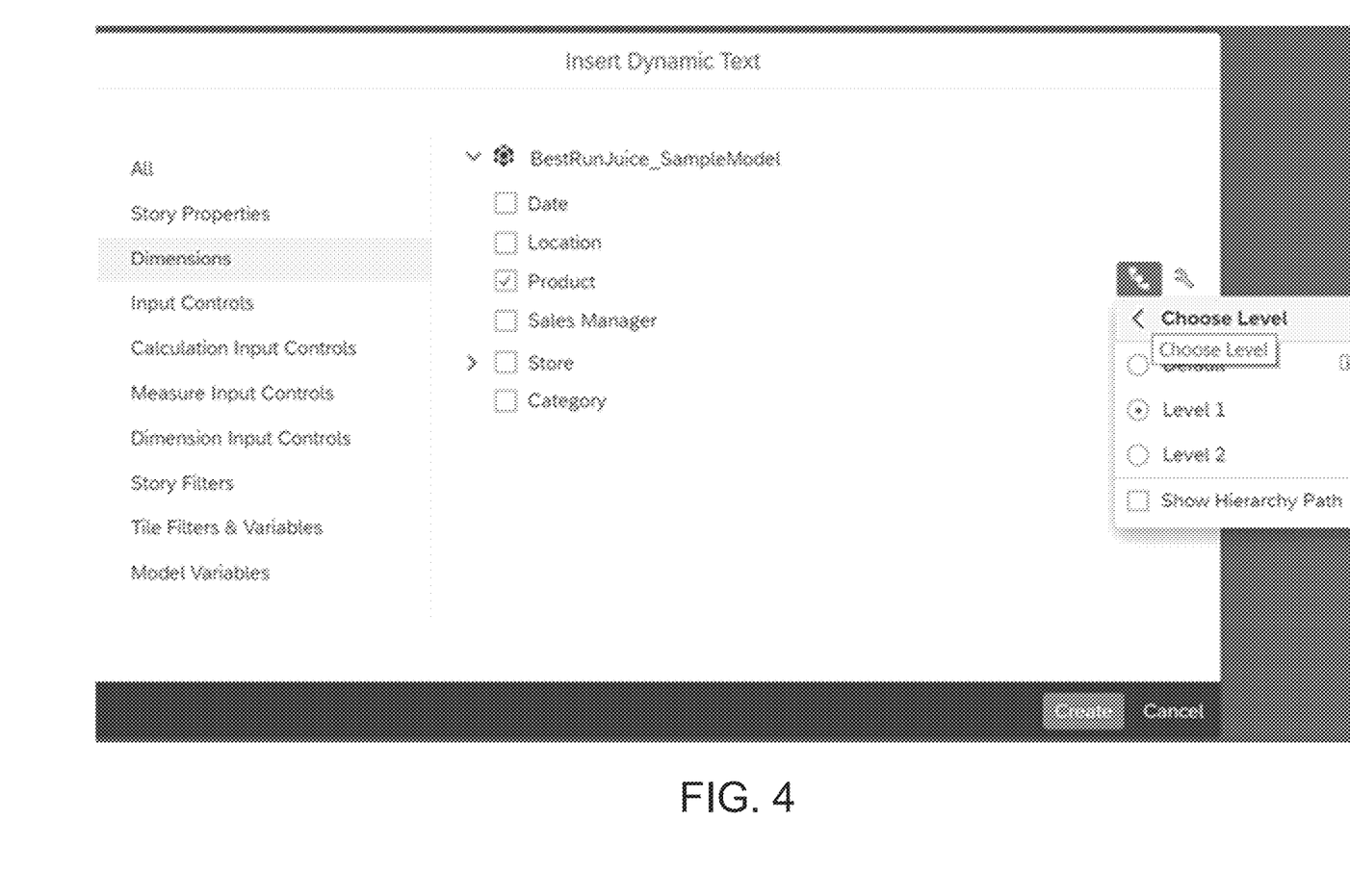
FIG. 4 shows a simplified screen shot of a dynamic text interface according to the example.

FIG. 4 shows a simplified view of a screen with the user selecting a dimension. Here, the dimension "Product" of the "BestRunJuice_SampleModel", is selected.

FIG. 4 also shows various configuration options relating to hierarchical information. For example, these configuration options allow selecting specific level(s) of the model hierarchy, as well as the option to show (or not) a hierarchy path.

Next, the dynamic text service contacts the model dimension dynamic text provider. Based on a unique key, the provider creates an instance of the EntityLOVService, which creates a query context.

The EntityLOVService then issues a query to the back end database of the storage layer. In this particular example, that back end database is administered using the FIREFLY database management service (DBMS).

Once the query results are returned, the provider parses the results based on configured options. These options can include substitution for Business Warehouse (BW) models (e.g., rather than the SAP HANA in-memory database) for handling of hierarchies, and/or massaging values into a more readable format.

Based upon the triggering of certain events, a new query is issued. That new query seeks to filter changes based upon UPDATE_CONTENT event. This is discussed further below in connection with FIG. 5.

Figure 8:
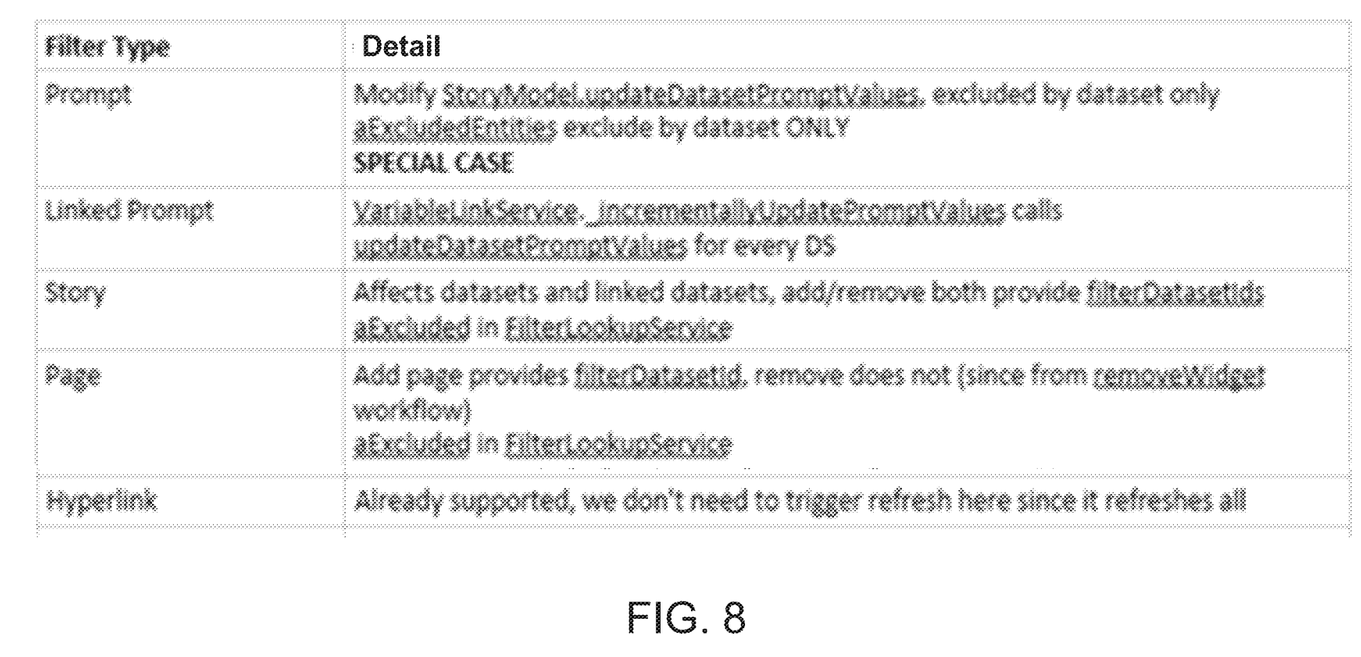
FIGS. 8-9 are tables showing details of handing of various filter types according to an exemplary implementation.
Figure 9:
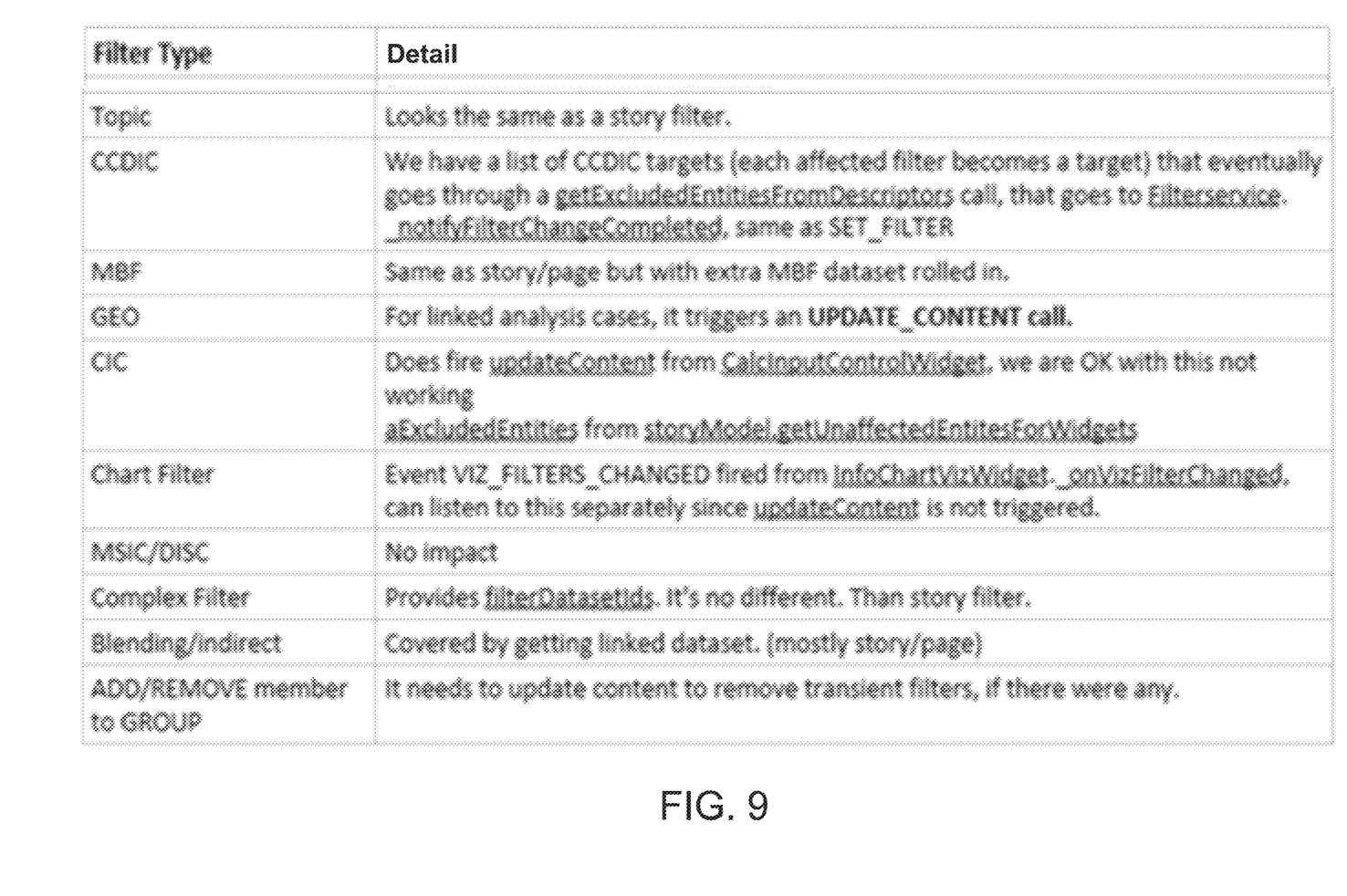

FIGS. 8-9 are tables showing details of handing of various filter types according to an exemplary implementation.

In this example, in addition to making modifications to the existing SAC as described above, embodiments may further implement other changes, including but not limited to:
Updating content of linked analysis;
Filtering of widgets;
Changing of calculations;
Addition or removal of datasets. It is noted that variables or prompts driven from a backend such as remote HANA or business warehouse (BW), may also be a source for LOV queries.

Figure 5:
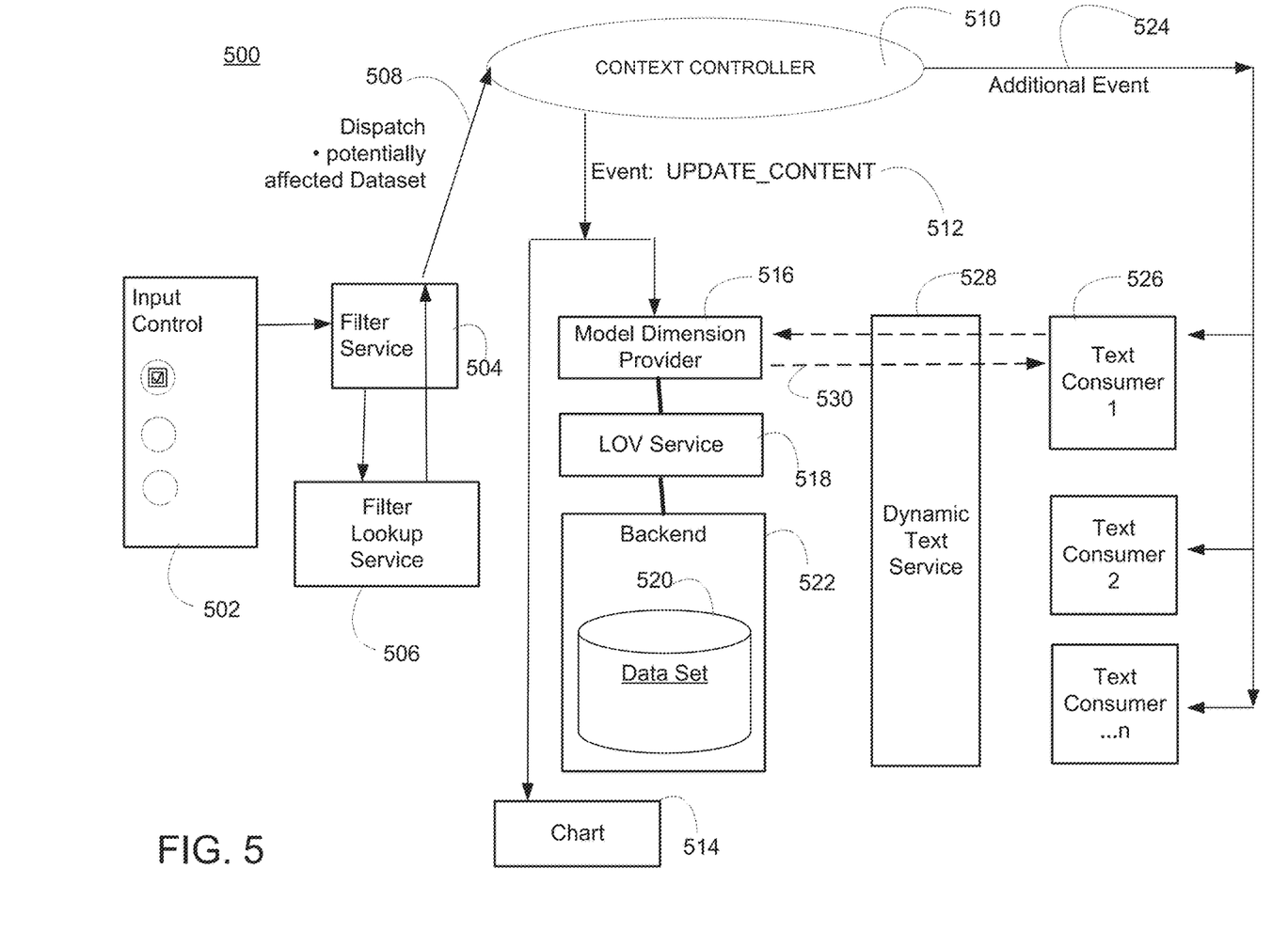
FIG. 5 shows a simplified block diagram illustrating details of dynamic text updating according to an example.

FIG. 5 shows a simplified view of an update process 500 for a dynamic text object created according to an example. Here, an input control 502 communicates with a filter service 504.

In response, the filter service communicates with a filter lookup service 506, to dispatch 508 a data set possibly affected by the input control.

That dispatched data set is received by context controller 510. Then, the context controller broadcasts an UPDATE_CONTENT event 512. That event 512 is received by chart 514 and also the model dimension provider 516.

The model dimension provider 516 then communicates via the LOV service 518 with the data set 520 of the back end 522.

Separately, an additional event 524 is broadcast to the text consumers 526. In response to that additional event, the text consumers communicate with the model dimension provider via the dynamic text service 528.

Then, in the manner previously described, this communication results in the model dimension provider generating a second dynamic text object 530 comprising an updated list of values from the data set. Then, the second dynamic text object is communicated back to the text consumer.

The above example and corresponding use cases have been described in connection with the SAP Analytics Cloud available from SAP SE, in conjunction with a back end data set administered by a FIREFLY database management system. However, embodiments are not specifically limited to such an implementation, and other structures could alternatively be utilized. For example, an embodiment could offer a dynamic text capability that is not limited to a dimension of a story model, but instead considers other structures in a data set (e.g., measures, data objects).

Returning to FIG. 1, there the particular embodiment is depicted with the engine responsible for providing a dynamic text interface being located outside of the database storing the data set However, this is not required.

Rather, alternative embodiments could leverage the processing power of an in-memory database engine (e.g., the in-memory database engine of the HANA in-memory database available from SAP SE), in order to perform various functions.

Figure 6:
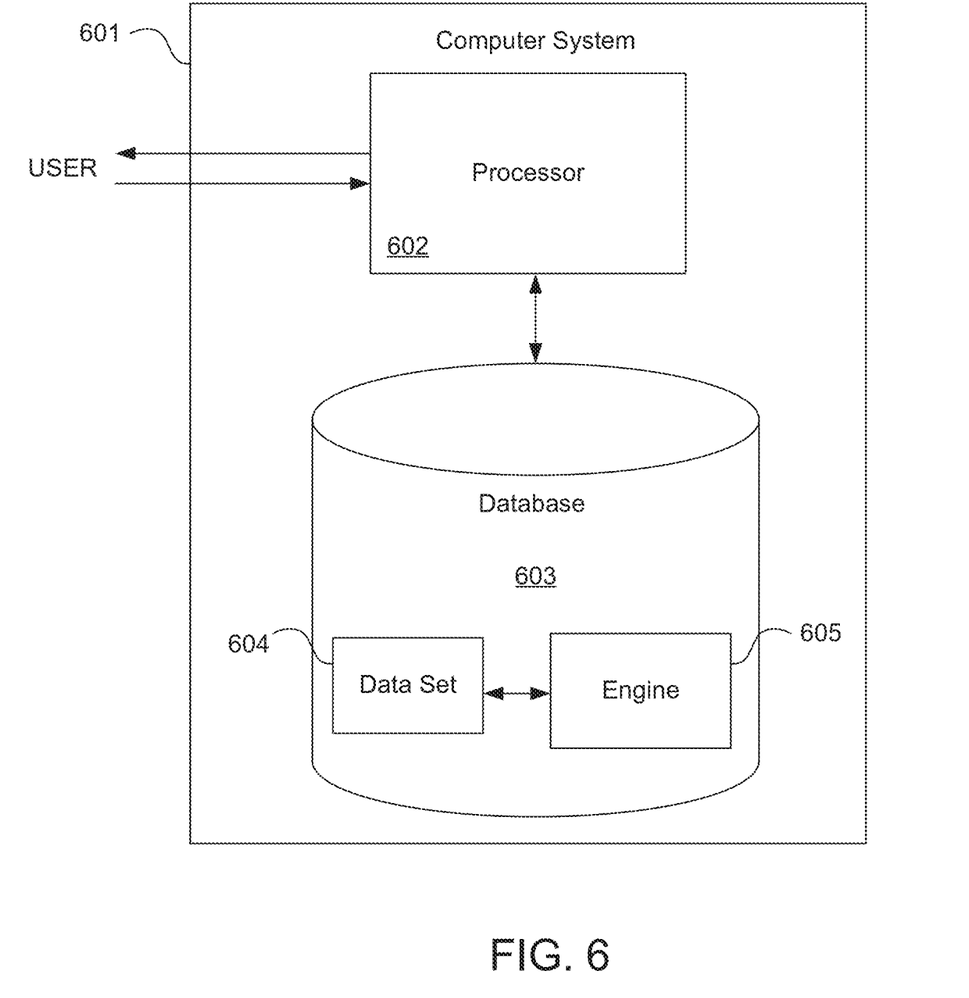
FIG. 6 illustrates hardware of a special purpose computing machine according to an embodiment that is configured to implement a dynamic text interface.

Thus FIG. 6 illustrates hardware of a special purpose computing machine configured to implement a dynamic text interface according to an embodiment. In particular, computer system 601 comprises a processor 602 that is in electronic communication with a non-transitory computer-readable storage medium comprising a database 603. This computer-readable storage medium has stored thereon code 605 corresponding to an engine. Code 604 corresponds to a data set. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
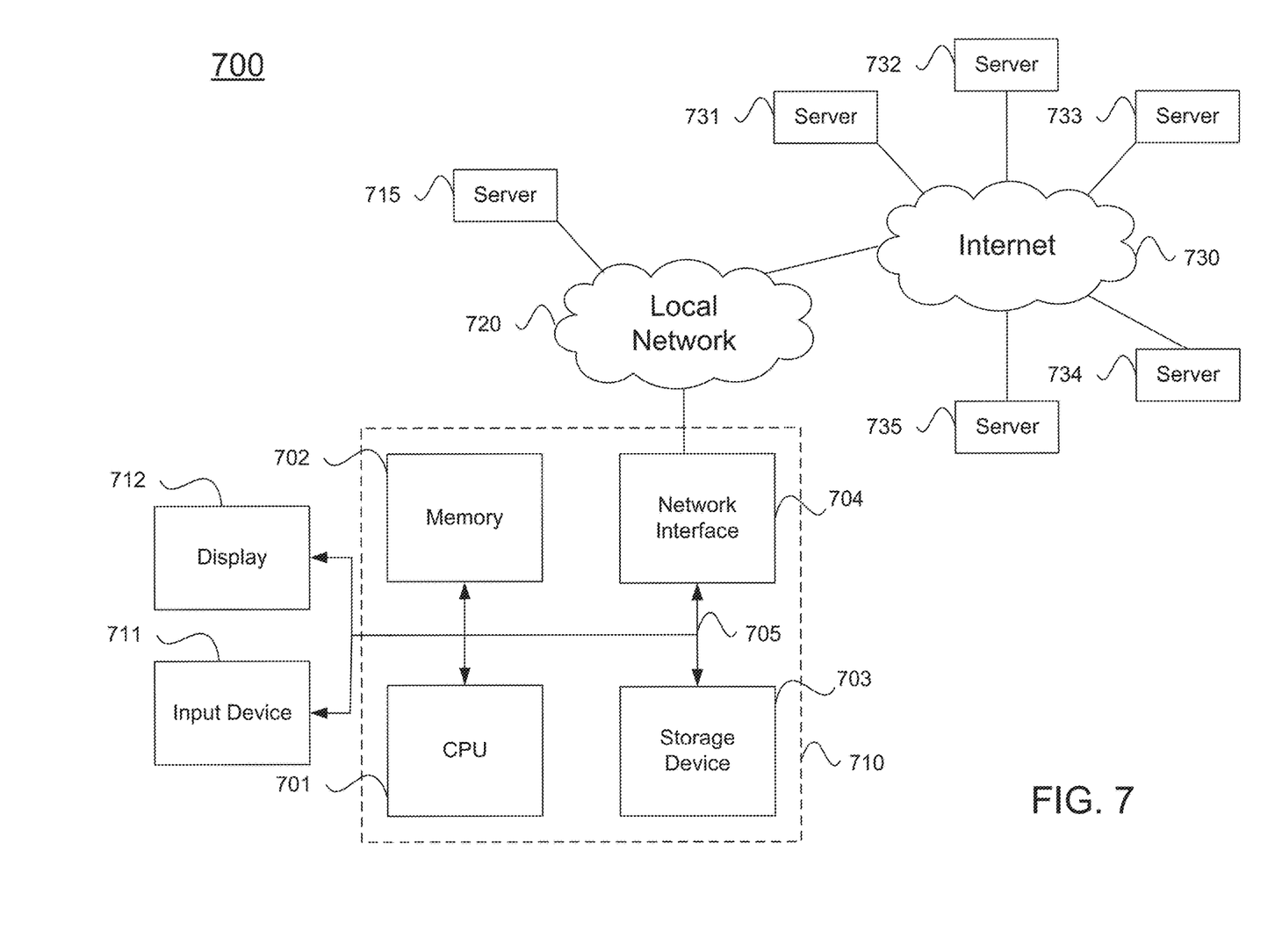
FIG. 7 illustrates an example computer system.

An example computer system 700 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   receiving from a text consumer via a text service, a first input including,
      a first identifier of the text consumer,
      a second identifier of a data set stored in a database and organized according to a model, and
      a third identifier of a dimension in the data set;
   in response to the first input, an engine referencing the model defining a story-dimension hierarchy including the dimension, to provide a context;
   the engine creating a query based upon the context;
   the engine issuing the query to the data set;
   the engine receiving a query result comprising a list of values for the dimension;
   the engine generating a first dynamic text object including the query result;
   the engine communicating the first dynamic text object to the text consumer via the text service;
   the engine receiving a broadcast update event;
   in response to the broadcast update event, the engine generating a second dynamic text object comprising an updated list of values from the data set;
   in response to an updated input received from the text consumer via the text service, the engine communicating the second dynamic text object;
   receiving from the text consumer via the text service, a second input including a story filter; and
   in response to the second input, bypassing the engine to return a relevant story from the model, wherein:
   the first input further comprises a first configuration option selecting a specific level of the hierarchy, and a second configuration option specifying whether or not to show a hierarchy path; and
   the first dynamic text object is generated according to the first configuration option and the second configuration option.

2. A method as in claim 1 wherein the updated input is triggered by the text consumer receiving an additional broadcast event.

3. A method as in claim 1 wherein:
   the database comprises an in-memory database; and
   the dynamic text object is generated by an in-memory database engine of the in-memory database.

4. A non-transitory computer readable storage medium embodying a computer program for performing a method, said method comprising:
   receiving from a text consumer via a text service, first input including,
      a first identifier of the text consumer,
      a second identifier of a data set stored in a database and organized according to a model, and
      a third identifier of a dimension in the data set;
   in response to the first input, an engine referencing the model defining a story-dimension hierarchy including the dimension, to provide a context;
   the engine creating a query based upon the context;
   the engine issuing the query to the dataset;
   the engine receiving a query result comprising a list of values for the dimension;
   the engine generating a first dynamic text object including the query result;
   the engine communicating the first dynamic text object to the text consumer via the text service;
   the engine receiving a broadcast update event broadcast;
   in response to the broadcast update event, generating a second dynamic text object comprising an updated list of values from the data set;
   in response to an updated input received from the text consumer via the text service, the engine communicating the second dynamic text object;
   receiving from the text consumer via the text service, a second input including a story filter; and
   in response to the second input, bypassing the engine to return a relevant story from the model, wherein:
   the first input further comprises a first configuration option selecting a specific level of the hierarchy, and a second configuration option specifying whether or not to show a hierarchy path; and
   the first dynamic text object is generated according to the first configuration option and the second configuration option.

5. A non-transitory computer readable storage medium as in claim 4 wherein the updated input is triggered by the text consumer receiving an additional event.

6. A computer system comprising:
   one or more processors;
   a software program, executable on said computer system, the software program configured to cause an in-memory database engine of an in-memory database to:
   receive from a text consumer via a text service, an input including,
      a first identifier of the text consumer,
      a second identifier of a data set stored in a database and organized according to a model, and
      a third identifier of a dimension in the data set;
   in response to the input, reference the model defining a story-dimension hierarchy including the dimension, to provide a context;
   create a query based upon the context;

issue the query to the dataset;
receive a query result comprising a list of values for the dimension;
generating a first dynamic text object including the query result;
communicating the first dynamic text object to the text consumer via the text service;
receiving a broadcast update event;
in response to the broadcast update event, the in-memory database engine generating a second dynamic text object comprising an updated list of values from the data set; and
in response to an updated input received from the text consumer via the text service, the in-memory database engine communicating the second dynamic text object;
wherein the engine is bypassed in returning a relevant story from the model in response to a story filter input received from a user interface, wherein:
the first input further comprises a first configuration option selecting a specific level of the hierarchy, and a second configuration option specifying whether or not to show a hierarchy path; and
the first dynamic text object is generated according to the first configuration option and the second configuration option.

7. A computer system as in claim 6 wherein the updated input is triggered by the text consumer receiving an additional event.

* * * * *